(12) United States Patent
Ling et al.

(10) Patent No.: US 7,583,599 B1
(45) Date of Patent: Sep. 1, 2009

(54) TRANSPORTING STREAM CLIENT SIGNALS VIA PACKET INTERFACE USING GFP MAPPING

(75) Inventors: Jing Ling, Fremont, CA (US); Vasan Karighattam, Davis, CA (US); Jean-Michel Caia, San Francisco, CA (US); Edward Pullin, Breinigsville, PA (US); Mark Feuerstraeter, Granite Bay, CA (US); Juan-Carlos Calderon, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 10/952,241

(22) Filed: Sep. 27, 2004

(51) Int. Cl.
*G01R 31/08* (2006.01)
(52) U.S. Cl. .................. 370/235; 370/907; 370/476
(58) Field of Classification Search .............. 370/235, 370/907, 476, 522
See application file for complete search history.

(56) References Cited

U.S. PATENT DOCUMENTS

| | | | | |
|---|---|---|---|---|
| 6,640,277 | B1* | 10/2003 | Moertl | 710/305 |
| 7,042,904 | B2* | 5/2006 | Kamiya | 370/466 |
| 7,272,675 | B1* | 9/2007 | Paul et al. | 710/52 |
| 7,301,906 | B2* | 11/2007 | Nation et al. | 370/235 |
| 2003/0084219 | A1* | 5/2003 | Yao et al. | 710/300 |
| 2003/0185251 | A1* | 10/2003 | Ichino et al. | 370/535 |
| 2004/0085902 | A1* | 5/2004 | Miller et al. | 370/235 |
| 2005/0041695 | A1* | 2/2005 | Bordogna et al. | 370/528 |
| 2005/0117608 | A1* | 6/2005 | Karakawa et al. | 370/486 |
| 2005/0265379 | A1* | 12/2005 | Rao | 370/464 |
| 2006/0002411 | A1* | 1/2006 | Samrao | 370/412 |

OTHER PUBLICATIONS

International Telecommunications Union, "G.7041 Generic framing procedures—Recommendation (Dec. 2003)", http://www.itu.int/rec/T-REC-G.7041, posted Mar. 29, 2004, ITU-T Recommendation G.7041/Y.1303, (Mar. 29, 2004), 1-58.
International Telecommunications Union, "G.7041 Generic framing procedures—Amendment 2 (Jun. 2004)", http://www.itu.int/rec/T-REC-G.7041, posted Sep. 29, 2004, ITU-T Recommendation G.7041/Y.1303, (Sep. 29, 2004), 1-10.

* cited by examiner

*Primary Examiner*—Huy D. Vu
*Assistant Examiner*—Kibrom T Hailu
(74) *Attorney, Agent, or Firm*—Blakely, Sokoloff, Taylor & Zafman LLP

(57) ABSTRACT

A method and apparatus for transferring data traffic, such as in a SONET/SDH environment, is provided. Two designs are presented, each utilizing a dual device design, where one device performs GFP Framing and the other device performs GFP-T adaptation. The method and apparatus include a first device having a first device FIFO, the first device configured to receive data and assemble data into packets and transfer data across a packet interface when the first device FIFO contains more than N bytes. A second device comprises a second device FIFO, the second device configured to receive data packets from the packet interface and utilize a plurality of thresholds to maintain a quantity of data in the second device FIFO within a predetermined range. Depending on the design employed, control codes, such as 65B_PAD control codes, may be added in the first device under certain conditions to facilitate data transfer.

18 Claims, 8 Drawing Sheets

TRANSPORTING STREAM CLIENT SIGNALS VIA PACKET INTERFACE USING GFP MAPPING

BACKGROUND OF THE INVENTION

1. Field of the Invention

The present invention relates generally to the field of high speed data transfer, and more specifically to transparent GFP (Generic Framing Procedure) operation over specific interfaces.

2. Description of the Related Art

Data communication networks receive and transmit ever increasing amounts of data. Data is transmitted from an originator or requester through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH concepts are more fully detailed in various ANSI and ITU standards, including but not limited to the discussion of concatenated payloads, ITU-T G.707 2000, T1.105-2001 (draft), and T1.105.02-1995.

SONET/SDH may employ transparent GFP (Generic Framing Procedure) that seeks to overcome issues with transporting data over existing ATM and POS protocols. Transparent GFP, or GFP-T, mapping may be implemented in a device including client stream interfaces and transport interfaces, such as SONET/SDH. Such an implementation is shown in FIG. 1A. From FIG. 1A, the transport interface provides information to and receives information from the optional SONET/SDH or OTN block 51, which in turn interfaces with GFP framing block 52. GFP framing block 52 interfaces with GFP-T adaptation block 53, which provides and receives data over the stream interface. The framer device 50 houses these three components.

If GFP-T carries a Gigabit Ethernet stream (GbE) over a transport layer such as SONET/SDH or OTN, then either a serial GbE interface or a ten bit interface (TBI) or reduced ten bit interface (RTBI) may be needed on the framer device 50. Generally, the GFP-T standard may be adapted by processing GFP-T mapping using two devices connected via a stream interface, or using out-of-band signals. Such a stream interface may be highly dependent on the traffic type mapped.

For a single device that supports GFP-T mapping, the frame-mapped GFP (GFP-F) can also be implemented in the same device. GFP-F mapping protocols including header and HEC (Header Error Check) processing, frame delineation, scrambling, FCS calculation, client management frame insertion and extraction are common to GFP-T and GFP-F mappings. Additional support required for GFP-F in addition to that supported in GFP-T tends to be minimal.

However, in the presence of only stream interfaces, GFP-F can only be used to map packets recovered from the implemented stream interfaces. GFP-F can be used to map any type of packet, somewhat limiting the flexibility of GFP-F mapping.

Two main processes exist in the GFP-T mapping procedure. The first process, called GFP-T Adaptation here, adapts 8B/10B client signals via 64B/65B block codes and adapts 64B/65B code blocks into a GFP frame without the GFP headers. Adaptation also occurs in the reverse direction. The second process is GFP Framing. While GFP-T Adaptation is unique to GFP-T and is also unique for each traffic type, GFP Framing is identical for GFP-T (all traffic types) and GFP-F. Implementing GFP-T in one device (or via a proprietary stream interface) requires adding a new traffic type, such as Fibre Channel, having a different protocol or different rate. In such a situation, a new function may be need to be added.

In essence, advantages may be realized when providing both GFP-T and GFP-F mappings, but implementing them both on a single device can provide certain drawbacks. The difficulty becomes providing a design that captures the benefits of combined GFP-T and GFP-F mapping while minimizing the processing problems noted above.

With these restrictions on implementing GFP-F adaptation and GFP framing, it can be very difficult to realize an effective design where the protocol operates efficiently in the presence of a split design.

A transparent GFP mapping that enables efficient implementation of GFP-F adaptation and GFP framing may provide increased throughput and other advantageous qualities over previously known designs, including designs employing SONET/SDH architectures.

DESCRIPTION OF THE DRAWINGS

The present invention is illustrated by way of example, and not by way of limitation, in the figures of the accompanying drawings in which.

DETAILED DESCRIPTION OF THE INVENTION

The present design may provide for an implementation of a GFP-T Adaptation process and a GFP Framing process in a dual device configuration that employs an interface supporting burst transfer between the processes. While the description provided herein is applicable to the SONET/SDH architecture, it is to be understood that the invention is not so limited, and may be employed in other transmission architectures.

SONET/SDH defines optical carrier levels and electrically equivalent synchronous transport signals (STSs) for the fiber-optic based hierarchy. In SONET, any type of service, ranging from voice to high speed data and video, can be accepted by various types of service adapters. A service adapter maps the signal into the payload envelope of the STS-1 or virtual tributary. All inputs received are eventually converted to a base format of a synchronous STS-1 signal at 51.84 Mbps or higher. Several synchronous STS-1s may then be multiplexed together in either a single or two stage process to form an electrical STS-n signal, where n is one or more.

SONET uses a basic transmission rate of STS-1, equivalent to 51.84 Mbps. Higher level signals are integer multiples of the base rate. For example, STS-3 is three times the rate of STS-1, i.e. three times 51.84 or 155.52 Mbps, while an STS-12 rate would be twelve times 51.84 or 622.08 Mbps. The SONET architecture employs frames, where the frame is generally divided into two main areas: transport overhead and the synchronous payload envelope, or SPE. The SPE comprises two components, namely STS path overhead and payload. The payload is the traffic being transported and routed over the SONET network. Once the payload is multiplexed into the SPE, the payload can be transported and switched through SONET without having the need to be examined and possibly demultiplexed at intermediate nodes.

System Design

Figure 1A:
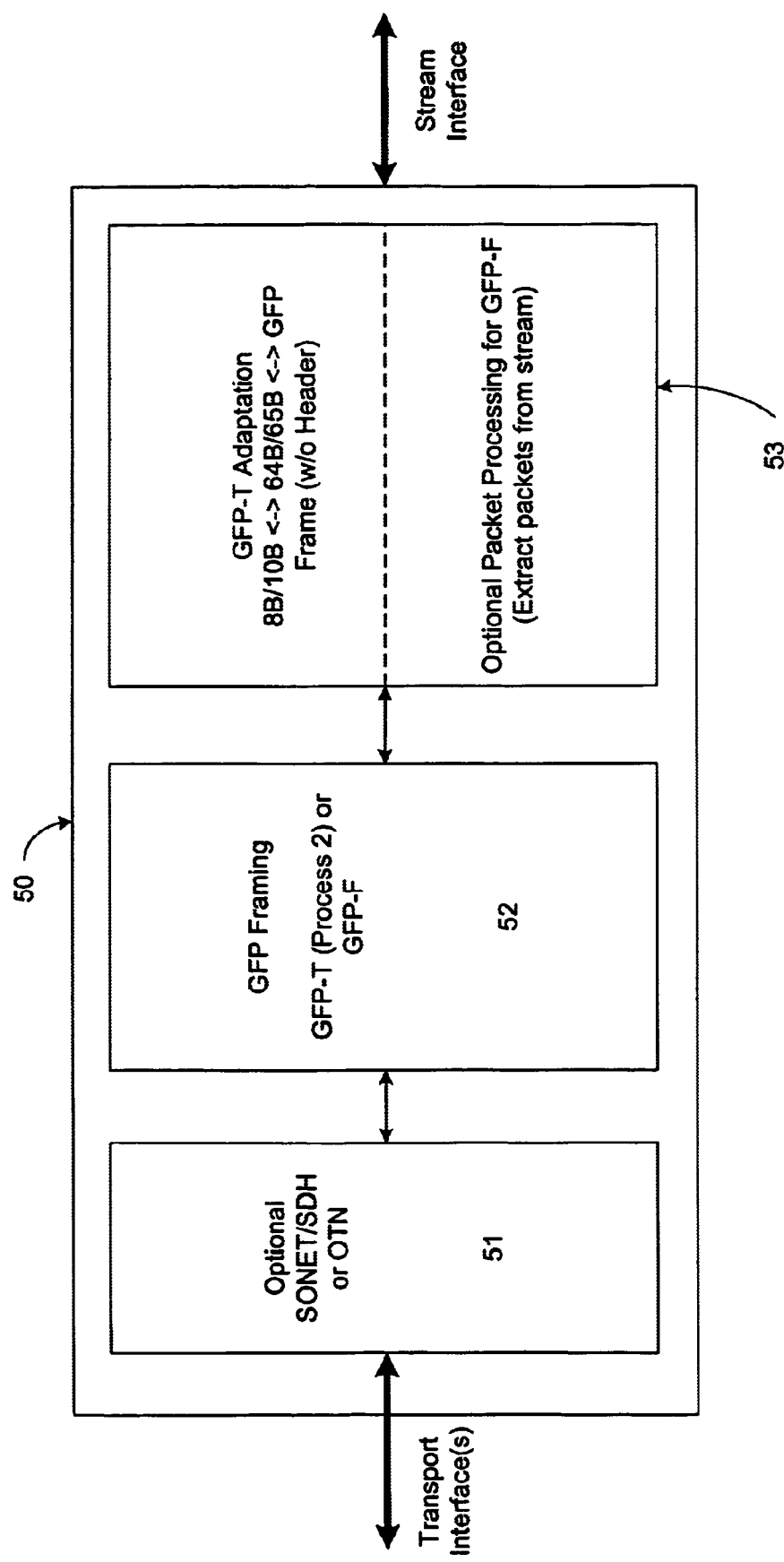
FIG. 1A is a drawing of a standard implementation of a single device implementation of GFP Framing and GFP-T Adaptation used to perform a GFP-T mapping between a transport interface and a stream interface.
Figure 1B:
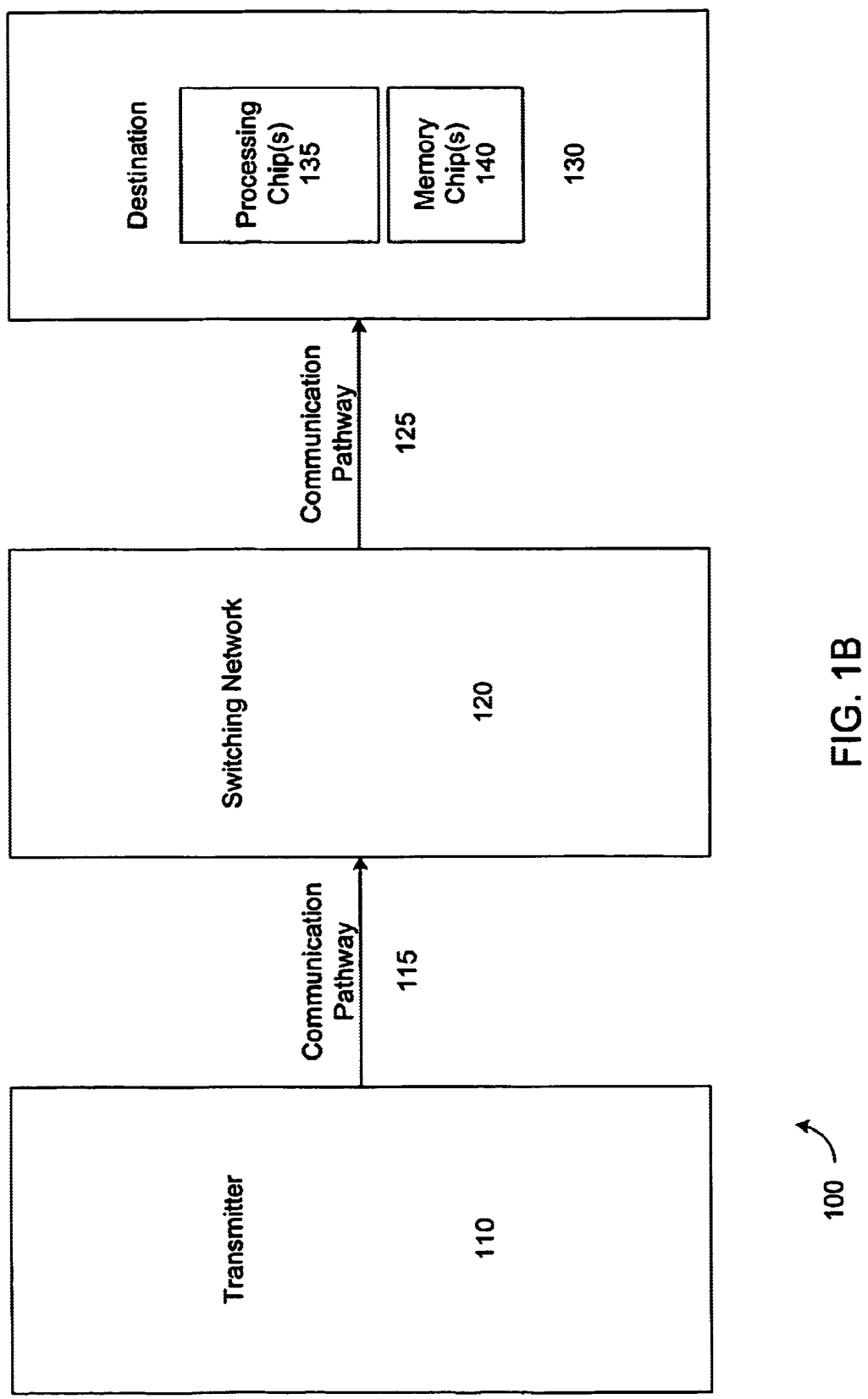
FIG. 1B is a conceptual illustration of a SONET/SDH communications switching system employing the design provided herein.

A typical SONET/SDH switching system 100 is shown in FIG. 1B. In the SONET/SDH switching system 100, a transmitter 110 is connected through a communication pathway 115 to a switching network 120. Switching network 120 is connected through a communication pathway 125 to a destination 130. The transmitter 110 sends data as a series of payloads/frames to the destination 130 through the switching network 120. In the switching network 120, packets typically pass through a series of hardware and/or software components, such as servers. As each payload arrives at a hardware and/or software component, the component may store the payload briefly before transmitting the payload to the next component. The payloads proceed individually through the network until they arrive at the destination 130. The destination 130 may contain one or more processing chips 135 and/or one or more memory chips 140.

Figure 1C:
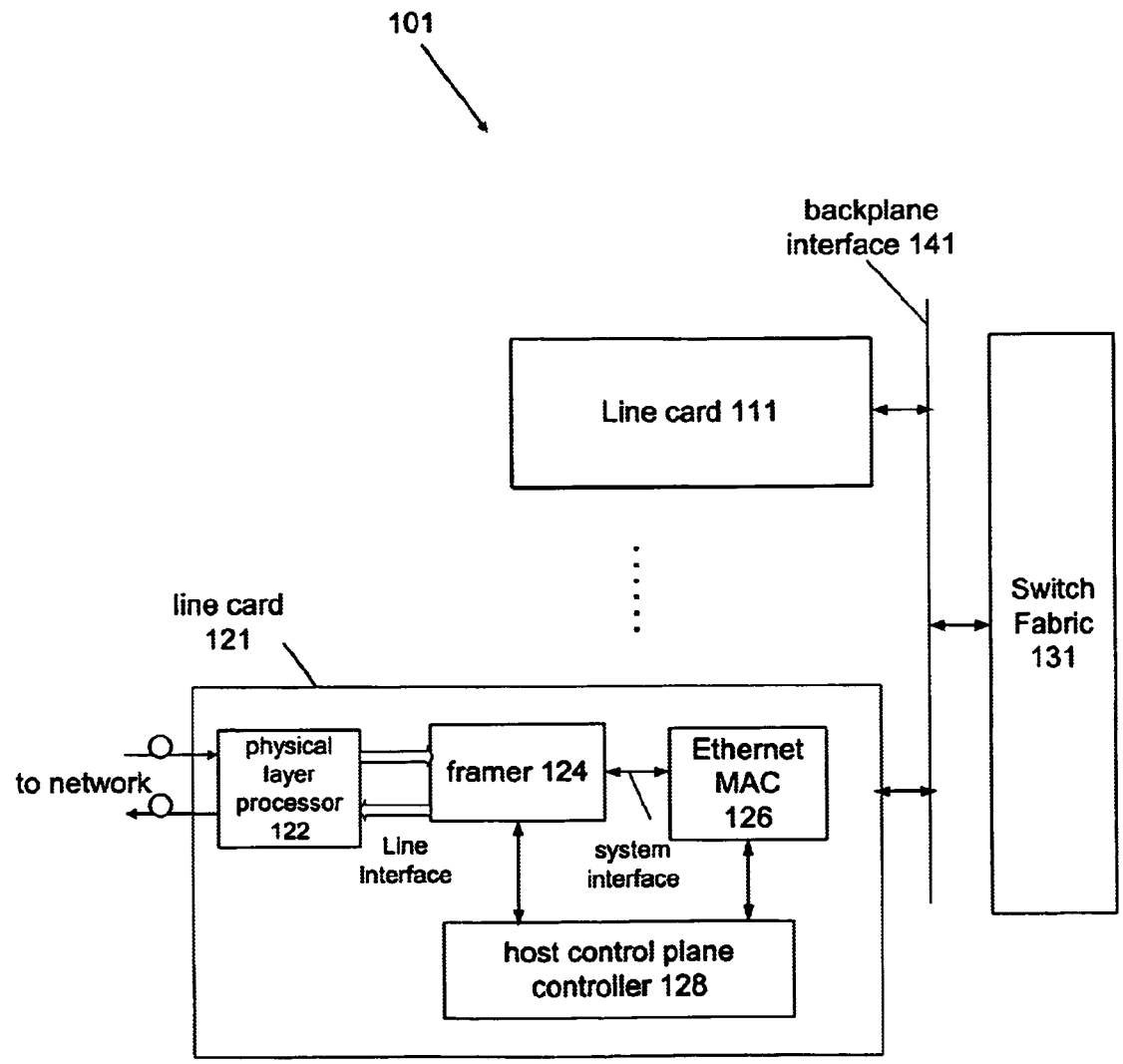
FIG. 1C shows a suitable system embodiment in accordance with an embodiment of the present invention.

FIG. 1C depicts a suitable system embodiment in accordance with an embodiment of the present invention. System 101 may include line card 111, line card 121, system fabric 131, and backplane interface 141. Line card 111 may be implemented as a SONET/SDH add-drop multiplexer, a Fibre Channel compatible line input, an Ethernet line input or a SONET/SDH line input.

Line card 121 may be implemented as a transceiver capable of transmitting and receiving frames and/or packets to and from a network that is compatible with SONET/SDH as well as other protocols such as OTN, TFI-5, and Ethernet, although other standards may be used. For example, SONET/SDH and OTN are described for example in: ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996). For example, an implementation of TFI-5 is described in TFI-5: TDM Fabric to Framer Interface Implementation Agreement (2003) available from the Optical Internetworking Forum (OIF). For example, IEEE 802.3 describes Ethernet standards.

For example, the network may be any network such as the Internet, an intranet, a local area network (LAN), storage area network (SAN), a wide area network (WAN). One implementation of line card 121 may include physical layer processor 122, framer 124, network processor 126, and host-control plane controller 128.

Physical layer processor 122 may receive optical or electrical signals from the network and prepare the signals for processing by downstream elements such as framer 124. For example, for frames and/or packets received from the network, physical layer processor 122 may convert an optical signal to electrical format and/or remove jitter from signals from the network. For frames and/or packets to be transmitted to the network, physical layer processor 122 may remove jitter from signals provided by upstream devices such as framer 124 and prepare signals for transmission to the network, which may be optical or electrical format. Framer 124 may utilize embodiments of the present invention to construct frames and/or packets for transmission to a network in formats such as Ethernet, SONET/SDH, and/or OTN (although other formats may be used).

For frames and/or packets received from a network, framer 124 may utilize embodiments of the present invention to process such frames and/or packets. Framer 124 may transfer overhead from frames and/or packets to a higher layer level processor such as a Ethernet MAC 126. For example, framer 124 and Ethernet MAC 126 may intercommunicate using an interface compatible for example with SPI-4 (described for example in the Optical Internetworking Forum (OIF Document) OIF-SPI4-02.1 and ITU-T G.707 2000, T1.105-2001 (draft), T1.105.02-1995, and ITU-T recommendations G.7042 and G.707), although interfaces compatible with other standards may be used.

Host-control plane controller 128 may configure operation of framer 124 and Ethernet MAC 126. For example, host-control plane controller 128 may program/provision framer 124 to control the content of frames. Host-control plane controller 128 could be implemented as separate from Ethernet MAC 126 and communicate with the framer 124 and Ethernet MAC 126 using an interface that complies with Peripheral Component Interconnect (PCI) Local Bus Specification, Revision 2.2, Dec. 18, 1998 available from the PCI Special Interest Group, Portland, Oreg., U.S.A. (as well as revisions thereof) or PCI-X Specification Rev. 1.0a, Jul. 24, 2000, available from the aforesaid PCI Special Interest Group, Portland, Oreg., U.S.A., although other standards may be used. Other implementations of Host-control plane controller 128 may be used.

In one implementation, components of line card 121 may be implemented among the same integrated circuit. In another implementation, components of line card 121 may be implemented among several integrated circuits that intercommunicate using, for example, a bus or conductive leads of a printed circuit board.

Backplane interfaces 131 may be implemented as a single or multi-pin interface and may be used by line cards to interface with system fabric 141. For example, backplane interfaces 131 may be compatible with TFI-5 or CSIX (described in CSIX-L1: Common Switch Interface Specification-L1 (2000)), although other standards may be used. System fabric 141 may transfer IP packets or Ethernet packets (as well as other information) between line cards based on relevant address and header information. System fabric 141 can be implemented as a packet switch fabric or a TDM cross connect. System fabric 141 can be any device (or devices) that interconnect numerous dataplanes of subsystems (i.e. linecards) together.

Transparent GFP Mapping

Figure 2:
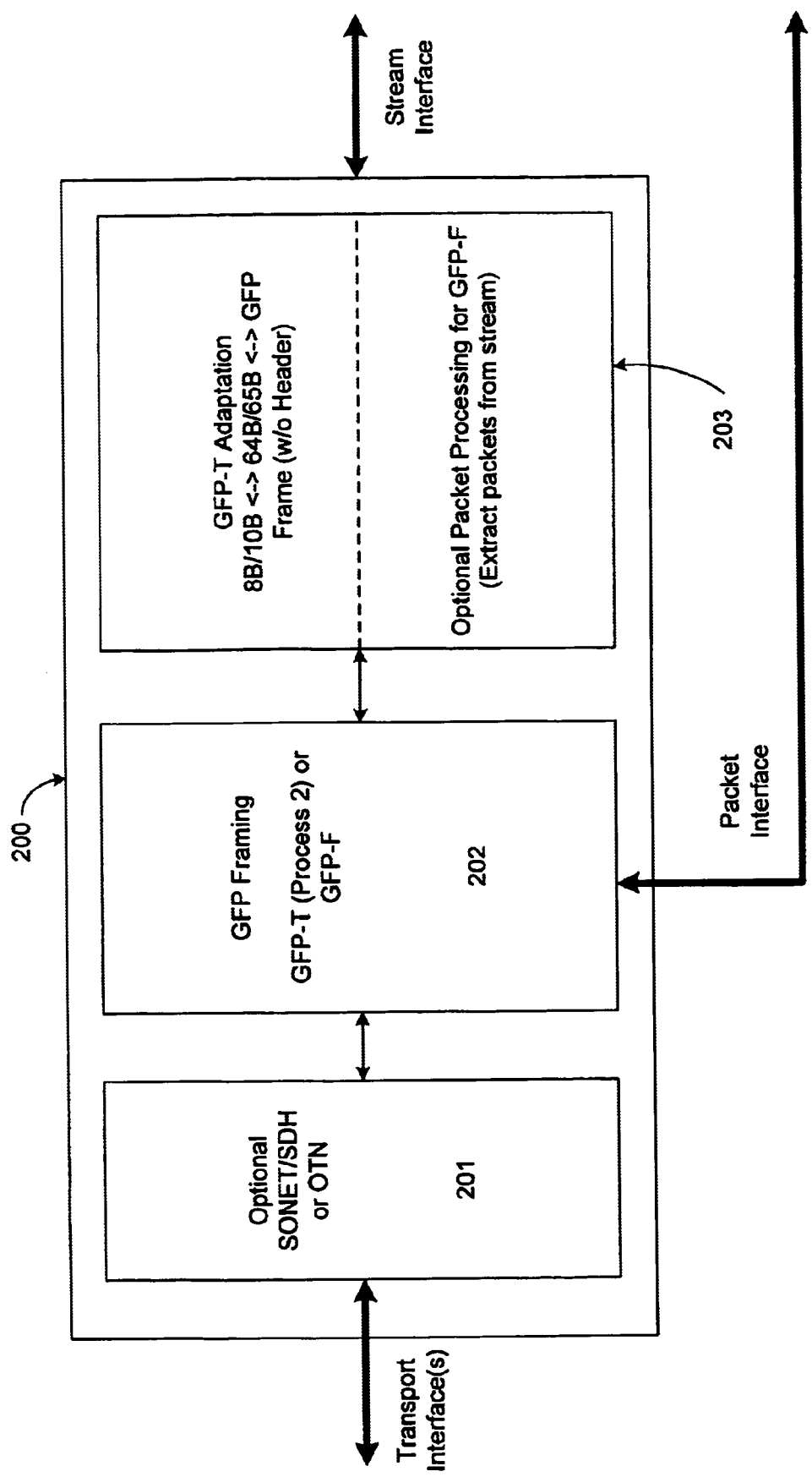
FIG. 2 illustrates a single device implementation having a packet interface to enhance flexibility.

FIG. 1A shows a standard implementation of a GFP-T process within a framer, enabling conversion of a stream interface to a transparent interface, and vice versa. FIG. 2 illustrates a modification of the standard design of FIG. 1A that may enable further flexibility in operation. In FIG. 2, the GFP Framing block 202 provides a packet interface connection, while Optional SONET/SDH or OTN block 201 and GFP Adaptation block 203 remain similar to FIG. 1A. The purpose of the design of FIG. 2 is to overcome certain limitations present in the design of FIG. 1A. With only stream interfaces, the framer can only use GFP-F to map packets recovered from the implemented stream interfaces.

As GFP-F can be used to map any type of packet, this limitation affects the flexibility of GFP-F mapping. GFP-F is particularly useful in the presence of a packet interface (e.g., OIF SPI-4, System Packet Interface Level 4, Phase 2). To take full advantage of GFP-F, a packet interface such as that shown in FIG. 2 may be provided in addition to the client stream interfaces. By employing both the stream interfaces and the packet interface, the implementation can be more complex and may require a relatively large physical package to accommodate the large pin count.

Figure 3:
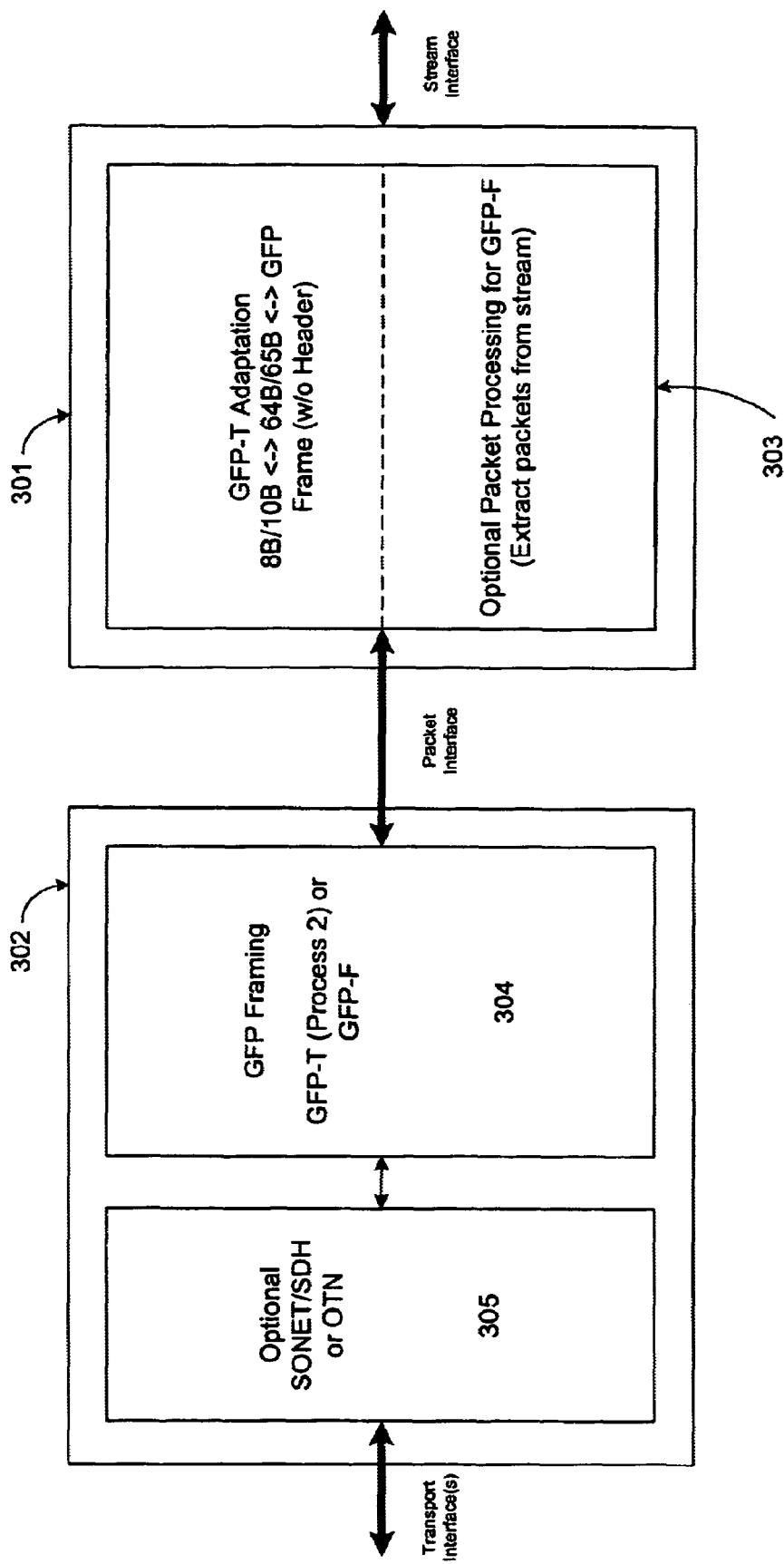
FIG. 3 shows a system diagram in accordance with the present designs having two separate devices connected by a packet interface.

The present design is employed in the configuration shown in FIG. 3. The present design implements the two processes of GFP-T mapping via a generic burst interface between two devices, device 1 301 and device 2 302, where device 1 performs GFP-T adaptation as shown in block 303 and device 2 performs GFP framing as shown in block 304 and may contain optional SONET/SDH or OTN functionality as shown in block 305. In the design of FIG. 3, particular procedures need to be followed so that the protocol operates adequately when using an interface supporting burst transfer. The present design relates to implementing rate adaptation in the GFP-T ingress direction (from the client or stream interface to the transport interface).

When implementing the two processes of GFP-T mapping via a generic burst interface, the GFP-T adaptation function as shown in device 1 301 of FIG. 3, where GFP-T adaptation is unique to each GFP-T traffic type, can be implemented either alone or together with a device that processes this type of traffic, such as a MAC (Media Access Control) for GbE (gigabit Ethernet). The second process, GFP Framing, can be implemented in a device supporting GFP-F mapping only. Both devices, such as device 1 301 and device 2 302, may include a packet interface supporting burst traffic, such as SPI-4 Phase 2. Multiple GFP-T mappers can be implemented across two devices using a multi-port packet interface such as SPI-4 Phase 2.

The present design includes two general designs for GFP-T rate adaptation in the ingress direction, or from device 1 301 to device 2 302. Rate adaptation to the transport output is performed using the 65B_PAD control code in device 1 301. Thus rate adaptation may be performed only in device 1 301. Transport frequency is only known in device 2 302. The only link between device 1 301 and device 2 may be the asynchronous packet interface, which is not synchronous to any of the client stream interfaces. The FIFO level in device 2 302 may be used by device 1 301 for rate adaptation. Any packet interface that reports FIFO status to the other device, such as SPI-4 Phase 2 reporting FIFO status from device 2 302 to device 1 301, may use the following first design approach.

First Design Approach: Four Thresholds

ITU-T G.7041 specifies that a 65B_PAD control code is inserted "if there is currently a transparent GFP frame is currently being transmitted and if there are no client characters ready for transmission by the transparent GFP mapper." The present design contemplates the transparent GFP mapper residing in two devices. Monitoring the FIFO level of device 1 301 in the ingress direction insures a relatively constant flow out of the GFP-T mapper in device 2 302. When the FIFO level drops below a certain value, the system inserts a 65B_PAD control code. Also, the FIFO status of device 2 302 may be used to limit the flow rate out of device 1 301.

Within device 1 301, for each client signal such as a GbE signal, after the 8B/10B to 64B/65B to superblock processing, B representing bit in this context, device 1 301 assembles multiple superblocks into packets. For example, the number of superblocks in each packet for GbE is typically 95. Whenever data is available, data may be written into the output FIFO of device 1 301, rather than waiting for the complete packet or even the entire superblock.

Device 1 301 may begin to transfer packets to device 2 302 after the data level in device 1's output FIFO reaches a threshold, here called THRESHOLD1. Before device 1 301 reaches THRESHOLD1, device 1 301 waits for data to accumulate. The value of THRESHOLD1 may vary, but is generally set to a value that minimizes risk of future FIFO underflow. For example, for GbE traffic, THRESHOLD1 can be set equal to 384 bytes. 384 bytes in the GbE traffic situation is not necessarily the minimum value that can be chosen, but a reasonable value based on the circumstances.

Data transfer between device 1 301 and device 2 302 is done in a block of N bytes. For example, the value of N may be a multiple of 16 bytes if SPI-4 Phase 2 is the selected burst interface. For the egress direction, a smaller value of N results in lower latency. However, a smaller value for N tends to increase the overhead related to data transfer, and may require a higher operating frequency at the packet interface. As an example, the value of N can be 64 bytes, but other values may be employed.

If the data level in the output FIFO of device 1 301 is below another threshold, here called THRESHOLD2, device 1 301 may insert one 65B_PAD control code whenever possible. THRESHOLD2 may be less than THRESHOLD1. For example, the value of THRESHOLD2 can be equal to 256 bytes for GbE traffic streams, but again other values may be employed.

In this design, device 1 301 and device 2 302 follow the normal packet transfer procedure. For example, using SPI-4 Phase 2, when the FIFO status from device 2 302 is satisfied, device 2 302 may send the previously granted 16-byte blocks.

Figure 4A:
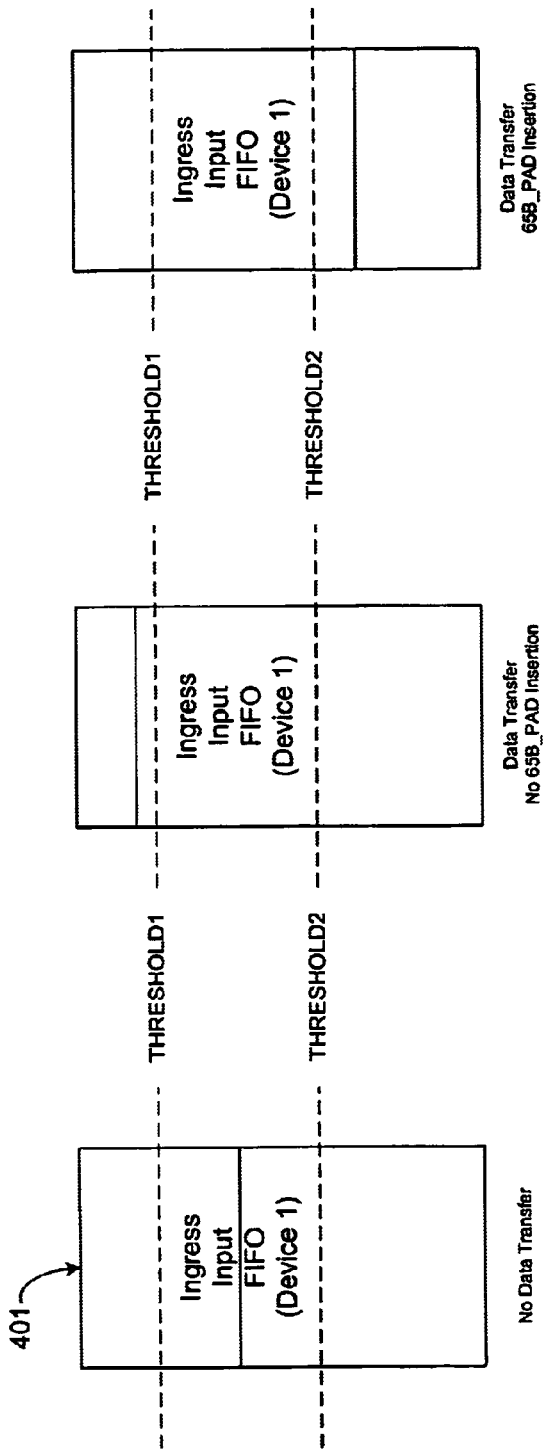
FIG. 4A is the ingress output FIFO in device 1 according to the first design.
Figure 4B:
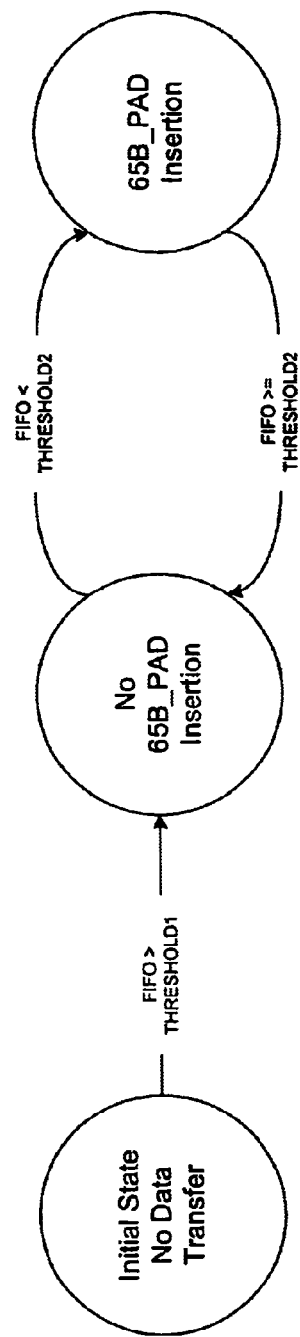
FIG. 4B shows a state diagram for ingress output for device 1 according to the first four threshold design.

FIG. 4A illustrates the general operation of device 1 301 using the aforementioned thresholds. At the start of the data transfer, the ingress output FIFO 401 for device 1 301 contains an amount of data, here above the value of THRESHOLD1 and THRESHOLD2. The corresponding state from FIG. 4B shows the Initial State, where no data transfer occurs.

However, as the FIFO is greater than THRESHOLD1, the state transitions to the No 65B_PAD Inserion state, and data transmitted may result in less data in ingress output FIFO 401, such as between THRESHOLD1 and THRESHOLD2. At this stage, no 65B_PAD insertion occurs. When data read out of the ingress output FIFO 401 results in a quantity below THRESHOLD2, the state transitions to 65B_PAD Insertion, and the value of the 65B_PAD is inserted into ingress output FIFO 401. Once the data in the ingress output FIFO is greater than or equal to THRESHOLD2, the result is a transition back to the No 65B_PAD Insertion state.

Device 2 302 operates in the following manner in this first design. Device 2 302 begins to read data from its ingress input FIFO upon reaching a certain threshold, here called THRESHOLD3. Device 2 302 waits for data to accumulate prior to reaching THRESHOLD3. The value of THRESHOLD3 may be set to avoid future FIFO underflow. For example, for GbE traffic, THRESHOLD3 can be set to 256 bytes. Again, this is not the minimum value for THRESHOLD3, but only a reasonable value based on circumstances.

GFP-T framing is generally done on the input packet in the same way as GFP-F processing. The output rate may be adapted to the output frequency of the transport interface.

Device 2 302 sends its FIFO status back to device 1 301. A round robin algorithm may be employed to decide the order for sending FIFO status values for multiple ports. When the level of data in the FIFO reaches a certain threshold, here called THRESHOLD4, device 1 301 sends the device 1 FIFO status back to device 2 302 in order to stop data transfer. THRESHOLD4 may be larger than THRESHOLD3. For example, the value of THRESHOLD4 can be equal to 384 bytes for GbE traffic streams. If SPI-4 Phase 2 packet interface is employed, the Normal status is STARVING or HUNGRY, or less than the threshold amount of data is available. In this instance, MaxBurst is equal to burst size of transfer, such as 64 bytes. When THRESHOLD4 is reached, the status is changed to STATISFIED to generally allow up to one more transfer of the burst size, again such as 64 bytes.

Figure 5A:
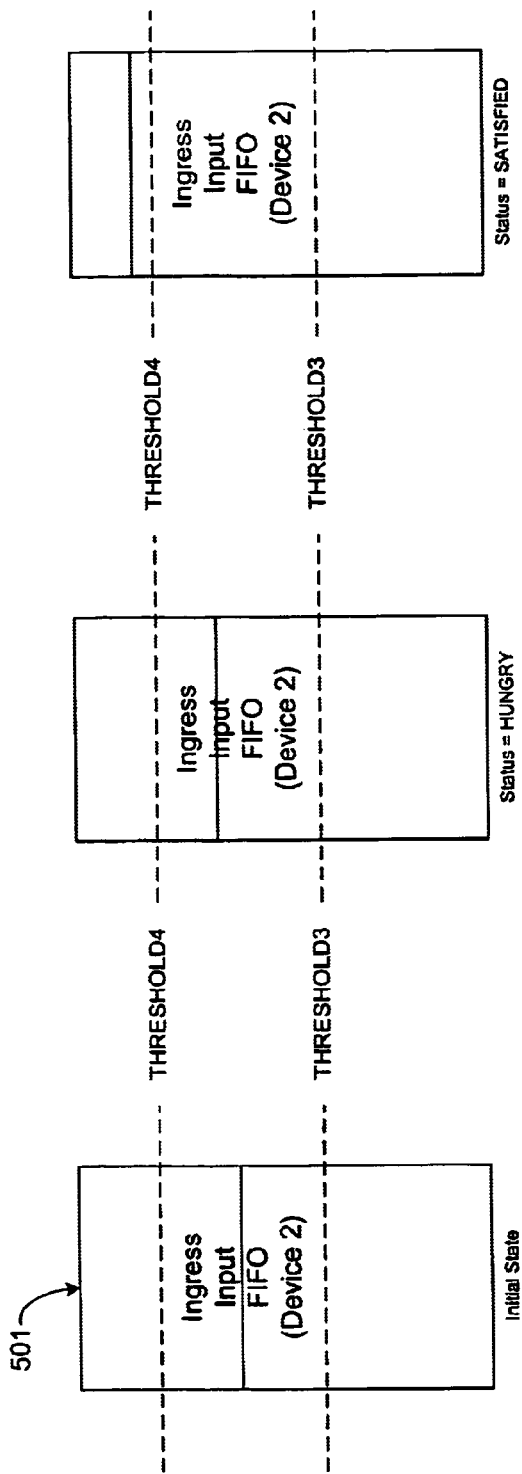
FIG. 5A is the ingress input FIFO in device 2 according to the first four threshold design.
Figure 5B:
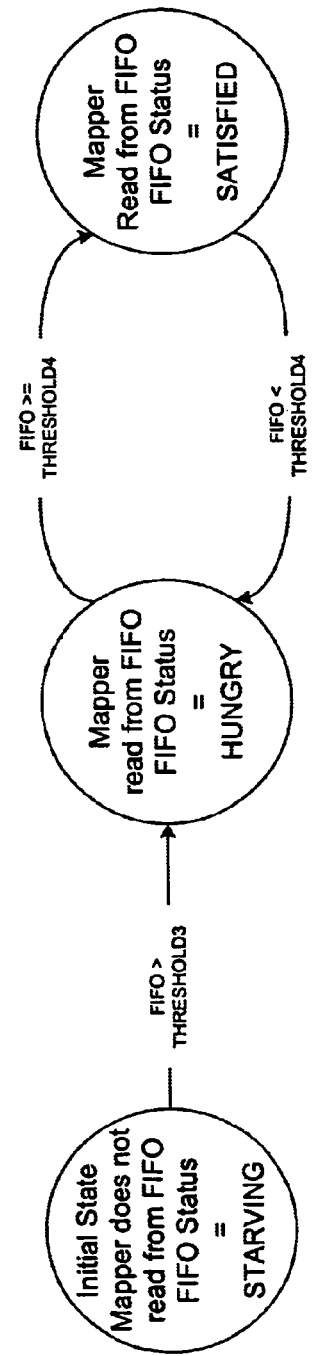
FIG. 5B illustrates a state diagram for ingress input for device 2 according to the first four threshold design.

FIG. 5A illustrates the ingress input FIFO for device 2 302 using the aforementioned thresholds. FIG. 5B illustrates the state diagram for this portion of the design. From FIG. 5A, ingress input FIFO 501 for device 2 302 may be filled to a certain level. If the value is below one or both of the thresholds, the status is HUNGRY or STARVING. Thus at the initial state, the data in ingress input FIFO 501 is evaluated. From FIG. 5B, initially, in the Initial State, the Mapper does not read from the FIFO. Once the FIFO value is greater than THRESHOLD3, the state transitions to the HUNGRY status state. In this state, the Mapper reads the FIFO status from the FIFO, and the Status is HUNGRY, indicating the FIFO status is between THRESHOLD3 and THRESHOLD4. Once the FIFO status is greater than or equal to THRESHOLD4, the state changes to status SATISFIED, or the Mapper reading the FIFO status from the FIFO and that status being SATISFIED, indicating the level of data is in excess of THRESHOLD4. If the FIFO status goes below THRESHOLD4, the Status shifts back to HUNGRY.

This design thus uses two sets of dual thresholds to determine when to insert a 65B_PAD in the ingress input FIFO for Device 1, and two thresholds in Device 2 to determine when to stop data transfer from Device 1.

Second Design Approach: Dual Thresholds

An alternative design can be used in the ingress direction and may reduce data latency. In such a design, device 1 301 generally should have knowledge of each specific traffic type.

For device 1 301 in this second design approach, for each client signal, such as a GbE, after the 8B/10B to 64B/65B to superblock processing, device 1 301 assembles multiple superblocks into packets. For example, the number of superblocks in each packet for GbE may be 95. Data can be written into the output FIFO of device 1 301 whenever the data are available, rather than waiting for the whole packet or even the whole superblock. This is generally the same as in the First Design Approach, above.

Transfer from Device 1 to Device 2 occurs in blocks of N bytes. N is multiple of 16 bytes if SPI-4 Phase 2 is used as the packet interface. As noted, smaller values of N yield lower latency at the expense of increasing transfer overhead. A smaller N thus requires higher operation frequency at the packet interface. The value of N can vary, and one possible value is 64 bytes.

Device 1 301 may transfer data to device 2 302 whenever more than N bytes exist in the FIFO. Device 1 inserts 65B_PAD control codes more frequently than during normal operation to help provide a relatively constant data flow. For GbE, if the packet interface uses a VC-4-7v (STS-3c-7v) to carry the GFP-T mapped data as recommended by ITU-T G. 7041, the average rate for inserting a 65B_PAD control code is once every 8112.27 bytes. In such an arrangement, device 1 may then insert one 65B-PAD control code every 4000 bytes, excluding Flag Bits and CRC-16.

Device 1 uses the received FIFO status signal from Device 2 to determine if a 65B_PAD control code may be inserted. Using SPI-4 Phase 2 as an example, normally the received FIFO status is STARVING and the 65B_PAD control code may be inserted as described above, namely once every 4000 bytes, excluding Flag Bits and CRC-16. When the status changes to HUNGRY, device 1 does not insert the 65B_PAD control code. In this situation, the FIFO status will never become SATISFIED.

For device 2 302, the device may start to read data from its ingress input FIFO upon reaching a certain threshold, here called THRESHOLD5. Before reaching THRESHOLD5, device 2 302 may wait for data to accumulate. The value of THRESHOLD5 is generally selected to avoid future FIFO underflow. For example, for GbE traffic, THRESHOLD5 can be equal to 256 bytes. Again, this value is one example, and other values may be employed.

GFP framing in device 2 302 is performed on the input packet in generally the same way as GFP-F processing. The output rate may be adapted to the output frequency of the transport interface. Device 2 302 sends the FIFO status back to device 1 301. Again, a round robin algorithm can be employed to provide an order for sending the FIFO status values for multiple ports. When the FIFO status reaches a certain threshold, here called THRESHOLD6, device 2 302 sends FIFO status back to device 1 301 to prevent 65B_PAD control code insertion within device 1 301. THRESHOLD6 is usually larger than THRESHOLD5. The value of these thresholds can vary, but for example, the value of THRESHOLD6 can be equal to 384 bytes for GbE traffic streams. If the packet interface complies with SPI-4 Phase 2, the Normal status is STARVING. When THRESHOLD6 is reached, the status is changed to HUNGRY.

Figure 6A:
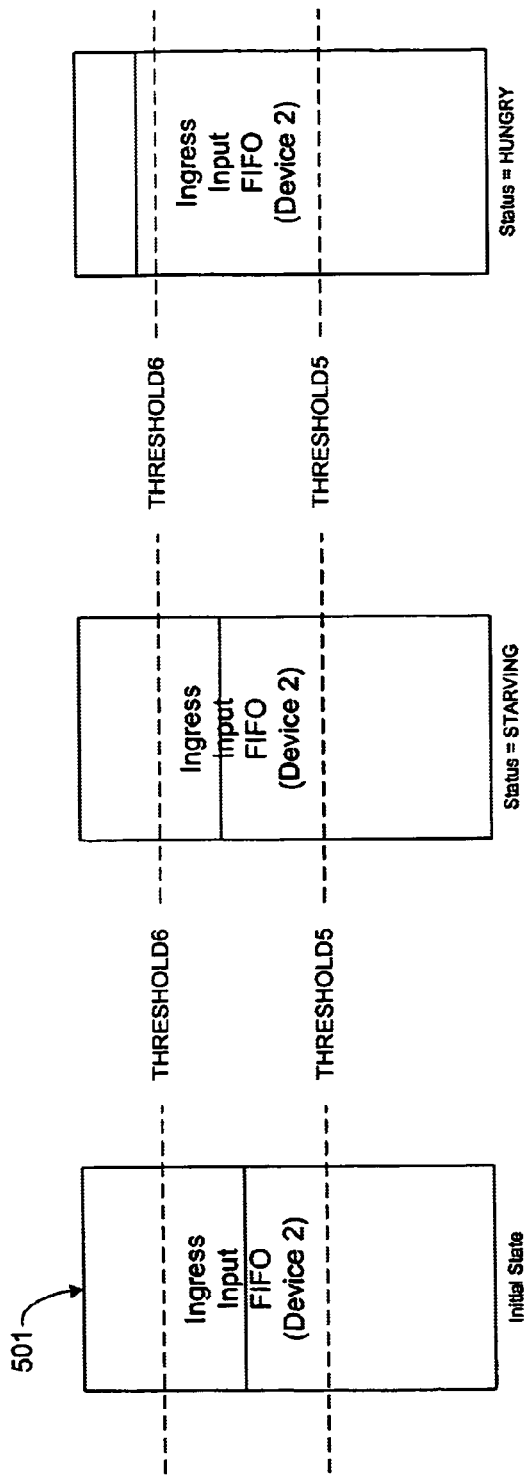
FIG. 6A shows an ingress input FIFO in device 2 according to the second dual threshold design.
Figure 6B:
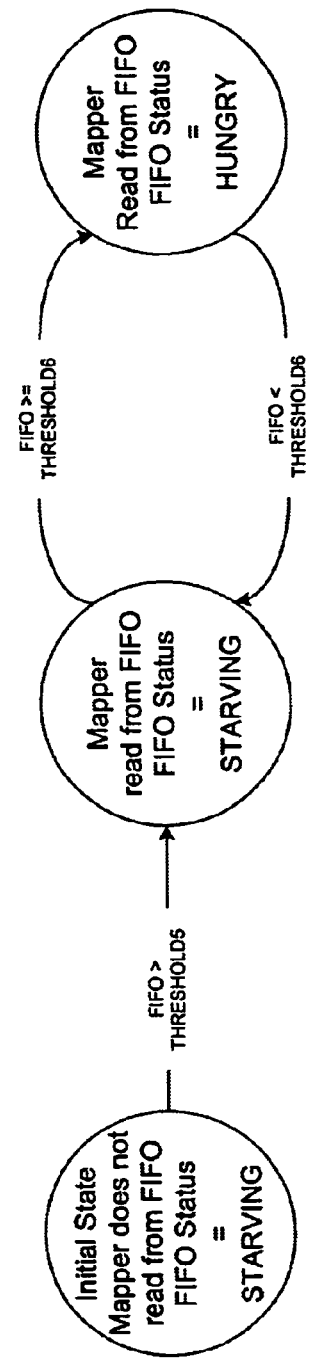
FIG. 6B is a state diagram for ingress input FIFO in device 2 according to the second dual threshold design.

FIGS. 6A and 6B show the arrangement for the ingress input FIFO for device 2 302 using these thresholds. From FIG. 6A, ingress input FIFO 601 for device 2 302 may be filled to a certain level. If the value is below one or both of THRESHOLD5 and THRESHOLD6, the status is STARVING. Thus at the initial state, or "Mapper does not read from FIFO and FIFO is STARVING" state, the data in ingress input FIFO 601 is evaluated. From FIG. 6B, initially the Initial State Mapper does not read from the FIFO. Once the FIFO value is greater than THRESHOLD5, the state transitions to the "Mapper reads from FIFO and FIFO status is STARVING" state. In this state, the Mapper reads the FIFO status from the FIFO, and the Status is STARVING, indicating the FIFO status is below THRESHOLD6. Once the FIFO status is greater than or equal to THRESHOLD6, the state again changes to status HUNGRY, or the "Mapper reads from FIFO and status is HUNGRY" state, indicating the level of data is in excess of THRESHOLD6. If the FIFO status goes below THRESHOLD6, the status shifts back to STARVING.

From device 2 302 to device 1 301, the egress direction, device 2 302 receives GFP frames formed of multiple superblocks and de-maps the superblocks. For example, with GbE, each GFP frame may include 95 superblocks, with 67 bytes in each superblock. At the output of device 2 302, each de-mapped GFP frame results in a packet of 6365 bytes, 67 bytes×95 superblocks. At this stage, device 2 302 has no knowledge of the superblock content. Device 2 302 transfers the resultant packets via the packet interface. For example, if a SPI-4 Phase 2 interface is used as the packet interface, each packet can be transferred in block of N bytes, where N is typically a multiple of 16. Smaller values of N result in lower latency, at the cost of increased transfer overhead. A smaller value of N thus requires a higher operation frequency at the packet interface. As an example, 64 bytes can be used for the value of N, but other values may be employed. By using the packet interface described herein, multiple ports, such as GbE ports, can be implemented in each of the two devices and can share the same packet interface for data transfer. The entire packet of N superblocks may be transferred, at the expense of higher latency.

When the packets are received at device 1 301, either of the two approaches for rate adaptation as described in ITU-T G.7041 can be used, generally without modification from the original specification. The two approaches described in the ITU-T G.7041 specification are described as rate adaptation to a local reference clock and rate adaptation from the transported client signal.

The two GFP-T ingress rate adaptation algorithms, or two design approaches, described in the specification are generally independent of the clock frequency on the burst interface, as long as the available transfer rate is higher than required. Minimal involvement from the mapper device that supports GFP framing is necessary using either design.

Both designs use existing control information on the burst interface, such as SPI-4 Phase 2, to communicate the rate information between the two devices involved. As noted, other burst interfaces may be employed.

By implementing the two processes of GFP-T mapping (GFP-T Adaptation and GFP Framing) across a burst interface, the GFP-T Adaptation, unique to each GFP-T traffic type, can be implemented either alone or together with a device that processes this type of client signal, such as a MAC for GbE. GFP Framing can be implemented in a device that supports GFP-F mapping only. Advantages to the two designs are that the burst interface, such as SPI-4 Phase 2 or SPI-3, is a standard interface, minimizing compatibility issues. The burst interface can be used for any type of traffic and is generally independent of the specific clock/rate of any data traffic. Further, no relationship exists between the frequency of the burst interface and the frequency of the client traffic. With these two designs, both GFP-F and GFP-T mappings can use a common standard interface and common processing. In general, when adding a new traffic type, only the device that implements the first process of GFP-T may need to be replaced. Alternately, a simple bridge at the packet interface can be added to merge the new traffic type.

It will be appreciated to those of skill in the art that the present design may be applied to other systems that perform data processing, and is not restricted to the communications structures and processes described herein.

Further, while specific hardware elements and related structures have been discussed herein, it is to be understood that more or less of each may be employed while still within the scope of the present invention.

Accordingly, any and all modifications, variations, or equivalent arrangements which may occur to those skilled in the art, should be considered to be within the scope of the present invention as defined in the appended claims.

What is claimed is:

1. A method for transferring data traffic between a plurality of devices supporting transparent generic frame procedure (GFP-T) mapping and frame generic frame procedure (GFP-F) mapping, said plurality of devices comprising a first device and a second device, the method comprising:

the first device implementing an adaptation process for GFP-T mapping, the first device having a stream interface;

a second device implementing a framing process for both GFP-T mapping and GFP-F mapping the second device having a transport interface;

providing a common burst interface between the first and second devices, the first device separate from the second device, the common burst interface being independent of a rate of data traffic into the devices; and performing rate adaptation for GFP-T mapping from the first device to the second device, wherein rate adaptation comprises:

monitoring a first set of thresholds of a data level of data accumulating in an output FIFO of the first device, the first set of thresholds including threshold 1 and threshold 2 greater than threshold 1;

transmitting data from the output FIFO of the first device to an input FIFO of the second device under a no-pad-insertion state until the data level of data accumulating in the output FIFO of the first device drops below threshold 2, the no-pad-insertion state preventing insertion of pad control codes in the transmitted data to maintain a constant flow of data during GFP-T mapping; and transmitting data from the output FIFO of the first device to the input FIFO of the second device under a pad-insertion state until the data level of data accumulating in the output FIFO of the first device returns from below threshold 2 to rise above threshold 1, the pad-insertion state permitting the insertion of pad control codes in the transmitted data to maintain the constant flow of data during GFP-T mapping;

monitoring a second set of thresholds of a data level of data accumulating in the input FIFO of the second device, the second set of thresholds including threshold 3 and threshold 4 greater than threshold 3;

reading transmitted data from the input FIFO of the second device after the data level of transmitted data accumulating in the input FIFO of the second device reaches threshold 3;

reporting, from the second device over the common burst interface to the first device, a hungry status of the input FIFO of the second device when the data level of transmitted data accumulating in the input FIFO of the second device drops below threshold 4 and a satisfied status when the data level of transmitted data accumulating in the input FIFO of the second device rises above threshold 4; and stopping transmitting data from the output FIFO of the first device to the input FIFO of the second device when the reported status of the input FIFO of the second device is a satisfied status.

2. An apparatus for transferring data traffic using transparent generic frame procedure (GFP-T) mapping and frame generic frame procedure (GFP-F) mapping, comprising: a first device comprising a first device FIFO, the first device configured to receive data and assemble said data into packets and transfer said data when said first device FIFO contains more than N bytes, the first device implementing a GFP-T adaptation process, the first device having a stream interface; a second device implementing a framing process for both GFP-T mapping and GFP-F mapping, the second device having a transport interface; a packet interface for receiving the data packets from the first device and transmit the data packets to a second device, the first device separate from the second device, the packet interface being independent of a rate of data traffic into the devices; and the second device comprising a second device FIFO, the second device configured to receive data packets from the packet interface and utilize a plurality of thresholds to maintain a quantity of data in the second device FIFO within a predetermined range; and performing rate adaptation for GFP-T mapping from the first device to the second device, wherein rate adaptation comprises: monitoring a first set of thresholds of a data level of data accumulating in an output FIFO of the first device, the first set of thresholds including threshold 1 and threshold 2 greater than threshold 1; transmitting data from the output FIFO of the first device to an input FIFO of the second device under a no-pad-insertion state until the data level of data accumulating in the output FIFO of the first device drops below threshold 2, the no-pad-insertion state preventing insertion of pad control codes in the transmitted data to maintain a constant flow of data during GFP-T mapping; and transmitting data from the output FIFO of the first device to the input FIFO of the second device under a pad-insertion state until the data level of data accumulating in the output FIFO of the first device returns from below threshold 2 to rise above threshold 1, the pad-insertion state permitting the insertion of pad control codes in the transmitted data to maintain the constant flow of data during GFP-T mapping; monitoring a second set of thresholds of a data level of data accumulating in the input FIFO of the second device, the second set of thresholds including threshold 3 and threshold 4 greater than threshold 3; reading transmitted data from the input FIFO of the second device after the data level of transmitted data accumulating in the input FIFO of the second device reaches threshold 3; reporting, from the second device over the common burst interface to the first device, a hungry status of the input FIFO of the second device when the data level of transmitted data accumulating in the input FIFO of the second device drops below threshold 4 and a satisfied status when the data level of transmitted data accumulating in the input FIFO of the second device rises above threshold 4; and stopping transmitting data from the output FIFO of the first device to the input FIFO of the second device when the reported status of the input FIFO of the second device is a satisfied status.

3. The apparatus of claim 2, wherein the second device sends a status of the second device FIFO back across the packet interface to the first device.

4. The apparatus of claim 3, wherein the first device inserts control codes in the first device FIFO under predetermined conditions, the control codes to maintain the quantity of data in the second device FIFO within a predetermined range.

5. The apparatus of claim 4, wherein said predetermined conditions comprise the second device FIFO reaching a first threshold, thereby causing the second device to transmit a second device FIFO status to the first device and the first device inhibiting control code insertion upon receiving the second device FIFO status.

6. A system for implementing transparent generic frame procedure (GFP-T) mapping and frame generic frame procedure (GFP-F) mapping in a dual device configuration, the system comprising:
a physical layer interface;
a framer comprising:
  a first device comprising a first device FIFO, the first device configured to receive data and assemble said data into packets, the first device implementing a GFP-T adaptation process, the first device having a stream interface; and
  a second device comprising a second device FIFO, the second device configured to receive data packets, the second device implementing a framing process for both GFP-T mapping and GFP-F mapping, the second device having a transport interface;
a network processor; and
an interface to at least provide intercommunication between the first and second devices of the framer and between the framer and the network processor, the packet interface being independent of a rate of data traffic into the first and second devices over their respective stream and transport interfaces, wherein the network processor adapts a rate for GFP-T mapping from the first device to the second device, including:
  monitoring a first set of thresholds of a data level of data accumulating in the first device FIFO, the first set of thresholds including threshold 1 and threshold 2 greater than threshold 1;
  transmitting data from the first device FIFO to the second device FIFO under a no-pad-insertion state until the data level of data accumulating in the first device FIFO drops below threshold 2, the no-pad-insertion state preventing insertion of pad control codes in the transmitted data to maintain a constant flow of data during GFP-T mapping; and
  transmitting data from the first device FIFO to the second device FIFO under a pad-insertion state until the data level of data accumulating in the first device FIFO returns from below threshold 2 to rise above threshold 1, the pad-insertion state permitting the insertion of pad control codes in the transmitted data to maintain the constant flow of data during GFP-T mapping;
  monitoring a second set of thresholds of a data level of data accumulating in the second device FIFO, the second set of thresholds including threshold 3 and threshold 4 greater than threshold 3;
  reading transmitted data from the second device FIFO after the data level of transmitted data accumulating in the second device FIFO reaches threshold 3;
  reporting, from the second device over the interface to the first device, a hungry status of the second device FIFO when the data level of transmitted data accumulating in the second device FIFO drops below threshold 4 and a satisfied status when the data level of transmitted data accumulating in the second device FIFO rises above threshold 4; and
  stopping transmitting data from the first device FIFO to the second device FIFO when the reported status of the second device FIFO is a satisfied status.

7. The system of claim 6, wherein the interface is compatible with PCI.

8. The system of claim 6, wherein the interface is compatible with PCI-x.

9. The system of claim 6, further comprising a host-control plane controller coupled to the interface.

10. The system of claim 6, wherein the second interface is compatible with PCI.

11. The system of claim 6, wherein the second interface is compatible with PCI-x.

12. The system of claim 6, further comprising a second interface and a system fabric.

13. The system of claim 12, wherein the second interface is compatible with TFI-5.

14. The system of claim 12, wherein the second interface is compatible with CSIX.

15. The system of claim 12, further comprising a line card capable of intercommunicating with the system fabric.

16. The system of claim 15, wherein the line card is capable of providing an interface for a Fibre Channel compatible network.

17. The system of claim 15, wherein the line card is capable of providing an interface for an Ethernet compatible network.

18. The system of claim 15, wherein the line card is capable for performing add-drop multiplexing.

\* \* \* \* \*